Patented July 29, 1941

2,250,504

UNITED STATES PATENT OFFICE 2,250,504

PHARMACEUTICAL PREPARATION

Piero Mariano Salerni, Maidenhead, Berkshire, England

No Drawing. Application August 15, 1939, Serial No. 290,199. In Great Britain April 28, 1933

3 Claims. (Cl. 167—58)

The invention relates to a new and useful pharmaceutical preparation, and is a continuation in part of my application Serial No. 722,050 filed April 23, 1934.

One object of the invention comprises, inter alia, a preparation which, upon contact with water, yields a solution possessing valuable therapeutical properties and characteristics. The invention will be more fully understood and still further objects thereof will appear from the following description.

The preparation in accordance with the invention contains a substance or substances yielding upon contact with water halogen, other than fluorine, and a water soluble organic material oxidizable in aqueous solution by such halogen. The halogen yielding component of my novel preparation is preferably used in the form of a "substantially solid system" which term, or any thereto equivalent expression, as hereinafter used in the specification and claims, connotes either a single substantially solid substance that on contact with water yields the desired halogen, or, a substantially solid combination of substances which, on contact with water, yield or react to yield the desired halogen. Such solid system, when embracing but a single substance, may be, for instance, composed of a suitable chlorine, bromine, or iodine yielding material or preferably a so-called "active" halogen containing substance of either inorganic nature, such as a suitable hypochlorite, hypobromide, or the like, or, of the organic type, such as a suitable chloramine, particularly chloramine T or the like. Alternatively, such solid system, when comprising a combination of substances may contain these either in the form of a mixture of two or more of the just recited materials or in the form of a mixture of two or more substances which upon contact with water will react with one another to produce the desired halogen, such as the combination of a suitable oxidation agent with a suitable halide. It is of course also possible within the scope of my invention to so select the combination of substances within the halogen yielding system that not only one single halogen, but a mixture of halogens is yielded on contact with water where such should be desired for the attainment of any particular purpose.

Within the preferred embodiment of my invention I use as the solid system a combination of a halide with a suitable agent containing active halogen capable of liberating the halogen from said halide and preferably a suitable chloramine in combination with a suitable, preferably water soluble, metal halide in which the halogen is displaceable by chlorine. The active chlorine upon contact with water, acts to liberate the halogen of the halide. Satisfactory results have been thus obtained with a solid system containing chloramine T and a water soluble metal iodide, both in substantially solid state.

The organic substance to be used in accordance with the invention should be preferably substantially water soluble and oxidizable in aqueous solution by the halogen yielded by the solid system upon its contact with water. It is in many cases of advantage to select as the organic substance a material which will yield an aqueous solution that is to an appreciable extent permeable to ultra-violet radiations. Numerous organic substances of the above-described character and nature have been tested and found useful within the purview of the invention and embrace substances of the aliphatic as well as aromatic, including carbocyclic and heterocylic series. Such substances are for instance substantially water soluble albumen and starch, the carbohydrates, particularly glucose (preferably dextrose) and arabinose, as well as water soluble aniline-, naphthol-, naphthylamine-, di-phenyl-, phenylene-, diamine-, indol-, phenol-, catechol-, toluidine-, oleic-, benzoic-, phthalic-, guanine-, urea-, derivatives and the like. Good results have been obtained particularly with glucose (preferably dextrose) as well as with sodium oleate and sodium benzoate. In lieu of using any one of the afore-recited substances singly, a combination of such organic substances may be used where such practice should be desirable. In the preferred practice of my invention, however, the use of a suitable glucose is recommended, and, when using a combination of organic substances a mixture of glucose and sodium benzoate will be found to give satisfactory results. Thus, where in the specification and claims I speak broadly of an organic substance or use such similar expression, I mean to include thereby a single organic substance of the afore-described character and nature, as well as a mixture of such substances.

At least substantially stochiometrical amounts of the respective ingredients composing the preparation in accordance with the invention are preferably used for the attainment of satisfactory results.

In the preferred application of my invention, a preparation comprising chloramine T, potassium iodide and glucose all in solid state is compounded. This preparation may be used as such if desired, but is preferably utilized in the form of its aqueous solution.

Aqueous solutions of the preparation in accordance with my invention possess valuable pharmacological, bacteriological and therapeutic properties. Their germicidal power and efficiency is in many instances considerably higher than that of the conventionally used antiseptics in equivalent concentration. As against certain bacteria, for instance, notably *Staphylococcus aureus* and *Eberthella typhosa*, the aqueous solutions exhibit a high phenol co-efficient and, as determined by direct contact tests, a germicidal efficiency far superior to that of considerably more concentrated aqueous phenol solutions (aqueous carbolic acid solutions). Despite the active halogen containing basis of the preparation compounded in accordance with the invention, its aqueous solutions are well tolerated in effective concentrations such as, for instance, concentrations up to 0.3% for the treatment, inter alia, of nose and throat ailments and irritations, thus making available an effective remedy in all those cases where concentrations of equal effectiveness of other substances conventionally used for such treatment are not sufficiently tolerated to permit their use except in unsatisfactory less effective lower concentrated solutions. In many instances where the commonly recognized treatment for a particular ailment or affliction prescribes the use or application of a remedy containing or liberating "active" halogen as, for instance, the use of chloramine T, in cases of sinus infection, tonsilitis, rhinitis, or the like, the medication with such substances is almost impossible, due to symptoms of allergy exhibited by the patients. Medication with aqueous solutions of the preparation in accordance with the invention on the other hand are in most instances not attended by this difficulty so that the aqueous solution of a preparation, containing, within the preferred embodiment of the invention, as the halogen yielding solid system chloramine T and potassium iodide, is well tolerated and substantially without discomfort by chlorine allergic persons. The aqueous solutions of the preparation in accordance with the invention permit, furthermore, in many cases, the realization of therapeutic results which it was hitherto difficult and in some instances even impossible to achieve by the application of the commonly used remedies ordinarily prescribed for such cases.

Effective concentrations of the aqueous solutions depend of course in each instance upon particular conditions as well as upon the specific result or objective desired to be attained. As a general rule, however, concentrations between 0.1 and 0.3% will suffice for satisfactory results. In cases involving treatment of the throat, ears, nose or sinus aqueous solutions of 0.1% to 0.2% have proven satisfactory.

Experiments have demonstrated that, though I use in the preferred embodiment of my invention, as one of the component parts of the halogen yielding solid system, an "active" halogen yielding substance, such as chloramine T, the afore-referred to properties of the aqueous solutions of my preparation are not due to the individual properties of any one of the component parts but are inherent in the product as such, as the aqueous solutions of the preparation are free from chloramine T or active chlorine in any other form. It is believed, however, that at least one of the causes to which the beneficial properties of the aqueous solutions of my preparation are attributable might be the emission of ultraviolet radiations within the solution. Immediately upon its contact with moisture the preparation liberates halogen, which oxidizes the dissolved organic material and it is this oxidation which is responsible for the emission of ultraviolet rays within the solution.

The foregoing description is by way of illustration and not of limitation, and it is, therefore, my intention that the invention be limited only by the appended claims or their equivalents, in which I have endeavored to claim broadly all inherent novelty.

I claim:

1. A pharmaceutical preparation comprising chloramine T and a water soluble metal iodide, both in solid state and a water soluble organic substance oxidizable in aqueous solution by iodine.

2. A pharmaceutical preparation according to claim 1 in which the water soluble organic substance is a carbohydrate.

3. A pharmaceutical preparation according to claim 1 in which the water soluble substance is glucose.

PIERO MARIANO SALERNI.